US009787117B2

(12) United States Patent
Bai et al.

(10) Patent No.: US 9,787,117 B2
(45) Date of Patent: Oct. 10, 2017

(54) BIDIRECTIONAL BATTERY CHARGER INTEGRATED WITH RENEWABLE ENERGY GENERATION

(71) Applicant: Conductive Holding, LLC, Akron, OH (US)

(72) Inventors: Hua Bai, Flint, MI (US); Alexander Balogh, Akron, OH (US); Xuntuo Wang, Cambridge, MA (US)

(73) Assignee: Conductive Holding, LLC, Cambridge, MA (US)

( * ) Notice: Subject to any disclaimer, the term of this patent is extended or adjusted under 35 U.S.C. 154(b) by 149 days.

(21) Appl. No.: 14/857,222

(22) Filed: Sep. 17, 2015

(65) Prior Publication Data

US 2017/0085106 A1    Mar. 23, 2017

(51) Int. Cl.
H02J 7/00      (2006.01)
H02M 3/335     (2006.01)
H02M 3/156     (2006.01)
H02J 7/35      (2006.01)

(52) U.S. Cl.
CPC ............ H02J 7/0052 (2013.01); H02J 7/35 (2013.01); H02M 3/156 (2013.01); H02M 3/33507 (2013.01); H02M 3/33584 (2013.01)

(58) Field of Classification Search
CPC .......... H02J 7/0052; H02J 7/35; H02M 3/156; H02M 3/33507
See application file for complete search history.

(56) References Cited

U.S. PATENT DOCUMENTS 5,388,040 A    2/1995 Hall
8,541,905 B2   9/2013 Brabec
(Continued)

FOREIGN PATENT DOCUMENTS

WO    WO-2015/044856 A1    4/2015

OTHER PUBLICATIONS

Bai, H. et al. "Design of an 11kW power factor correction and 10 kW ZVS DC/DC converter for a high-efficiency battery charger in electric vehicles", IET Power Electronics, revised Sep. 18, 2012, pp. 1-9.
(Continued)

Primary Examiner — Vuthe Siek
(74) Attorney, Agent, or Firm — Cesari and McKenna, LLP; James A. Blanchette

(57) ABSTRACT

In one embodiment, a bidirectional battery charger integrated with renewable energy generation includes a primary side AC/DC rectifier coupled to the electrical grid and a first DC bus, a DC/AC inverter coupled to the first DC bus and a primary winding, a secondary side AC/DC rectifier coupled to a secondary winding and a battery, and a boost converter coupled to a renewable energy generator and the first DC bus. The boost converter includes an active switch controlled by a control algorithm that, when renewable power is available, operates the active switch at a duty cycle that allows power to flow from the renewable energy generator to the first DC bus and on to charge the battery (without passing though the primary side AC/DC rectifier) or on to supply the electrical grid (without passing through the DC/AC inverter and secondary side AC/DC rectifier), and, when not available, disables the active switch.

20 Claims, 4 Drawing Sheets

(56) References Cited

U.S. PATENT DOCUMENTS

| | | |
|---|---|---|
| 2009/0103341 A1* | 4/2009 | Lee .................. H02J 7/022 363/124 |
| 2012/0014138 A1 | 1/2012 | Ngo et al. |
| 2013/0039104 A1 | 2/2013 | Sharma |
| 2013/0328527 A1 | 12/2013 | Kang |
| 2014/0140113 A1 | 5/2014 | Oh |
| 2014/0347893 A1 | 11/2014 | Hunter |
| 2015/0008850 A1 | 1/2015 | Zhao et al. |
| 2015/0049515 A1 | 2/2015 | Zhao et al. |

OTHER PUBLICATIONS

Duan, Chen et al. "Design of A 2.5kW 400V→12V High-Efficiency DC/DC Converter Using A Novel Synchronous Rectification Control for Electric Vehicles", ECCE 2013, pp. 1082-1086.

Taylor, Allan et al., "Design of a High-Efficiency 12V/1kW 3-Phase BLDC Motor Drive System for Diesel Engine Emissions Reductions", ECCE 2013, pp. 1077-1081.

* cited by examiner

BIDIRECTIONAL BATTERY CHARGER INTEGRATED WITH RENEWABLE ENERGY GENERATION

RELATED APPLICATION

This application is related to U.S. patent application Ser. No. 14/857,191, filed on Sep. 17, 2015 by Hua Bai, entitled "A BIDIRECTIONAL DC/DC CONVERTER FOR A CHARGING SYSTEM", the contents of which are incorporated by reference herein in their entirety.

BACKGROUND

Technical Field

This application relates generally to battery chargers for use with electric vehicles or other battery powered devices, and more specifically to a bidirectional battery charger integrated with renewable energy generation.

Background Information

In the past decade, there has been a significant increase in the use electric vehicles and other types of battery powered devices. Together with this increase there has been a similar increase in the use of battery chargers. In the case of electric vehicles, battery chargers have often taken the form of Level 1 or Level 2 alternating-current (AC) slow chargers. Such slow chargers typically utilize about 1.8 kilowatts (kW) in the case of Level 1 chargers, and 7.2 kW in the case of Level 2 chargers, of grid-supplied power. Some attempts have been made to produce AC fast chargers with high efficiency. Such fast chargers may utilize about 11 kW of power.

Regardless of type, the power t used by most battery chargers has typically been grid-supplied, without contribution from any local renewable energy generation (e.g., solar panels, wind turbines, geothermal generator, etc. that may be located nearby the charger). When renewable energy generation has been used alongside battery chargers, such systems have typically been totally isolated from each other, leading to high costs, limited control flexibility and lower than desired efficiency.

FIG. 1 is a schematic diagram 100 of a typical isolated arrangement of a battery charger and renewable energy generator. The electrical grid 110 supplies power AC, via inductive element L, to battery charger 120. The battery charger may include (not shown) an alternating current/direct current (AC/DC) rectifier coupled to a mono-directional direct current/direct current (DC/DC) converter. The output of the battery charger is a voltage $V_b$ that may be coupled to a battery (having resistance $R_b$) of an electric vehicle. Further, a renewable energy generator 130 (e.g., a solar array, wind turbine, geothermal generator, etc.) may supply DC power to a direct current/direct current (DC/AC) inverter 140, and the resulting AC power fed back toward the electrical grid 110.

The use of both a battery charger 120 and a separate DC/AC inverter 140 leads to increased deployment costs. Additional increased costs are often incurred by a need to overdesign the battery charger 120 to deal with power being supplied concurrently from the electrical grid 110 and the DC/AC inverter 140. The separation of the battery charger 120 and the DC/AC inverter 140 prevents any sort of responsive control involving the two components. Finally, the need for DC power originating from the renewable energy generator 130 to first be converted to AC power (via the DC/AC inverter 140) before it is then converted back to DC power (via the battery charger 120) leads to low system efficiency.

What is needed is a bidirectional battery charger (e.g., for an electric vehicle) that is integrated with renewable energy generation, which may address some or all of the shortcomings of prior designs.

SUMMARY

In an example embodiment, a bidirectional battery charger (e.g., for an electric vehicle) is integrated with renewable energy generation (e.g., a solar array, wind turbine, geothermal generator, etc.), so that power from a renewable energy generator may flow to charge a battery without passing through a primary side AC/DC rectifier of the charger, or flow to supply the electrical grid without passing through a DC/AC inverter or secondary side AC/DC rectifier of the charger. The integration uses a boost converter that couples the renewable energy generator to a first DC bus within the bidirectional battery charger. The boost converter may include an active switch (e.g., a metal oxide semiconductor field-effect transistors (MOSFET)), an inductive element and a diode.

More specifically, in an example embodiment, the bidirectional battery charger integrated with renewable energy generation may be a bidirectional AC fast charger for an electric vehicle. The bidirectional AC fast charger includes a primary side AC/DC rectifier coupled to the electrical grid and a first DC bus, and a DC/AC inverter coupled to the first DC bus and a primary winding of a transformer. The DC/AC inverter may include active switches (e.g., MOSFETs) coupled to a network of capacitors and an inductive element. A boost converter including an active switch (e.g., MOSFET) coupled between an inductive element and a diode that are arranged in series is also coupled to the first DC bus. A secondary side AC/DC rectifier is coupled to a secondary winding of the transformer. The secondary side AC/DC rectifier may include a capacitor that performs DC-bias current blocking and a bridge configuration of four active switches (e.g., MOSFETs). The secondary side AC/DC rectifier is coupled to a second DC bus, which is coupled to the battery of the electric vehicle.

A microcontroller is coupled to the active switches of the boost converter, DC/AC inverter and secondary side AC/DC rectifier, and configured to provide control signals (e.g., pulse width modulated (PWM) signals) thereto according to a control algorithm. The control algorithm may be configured to, when renewable power is available, send control signals to operate the active switch of the boost converter at a duty cycle to allow power to flow from the renewable energy generator to the first DC bus and on to charge the battery (without passing though the primary side AC/DC rectifier) or on to supply the electrical grid (without passing through the DC/AC inverter and secondary side AC/DC rectifier), and when renewable power is not available, send control signals to disable the active switch of the boost converter to isolate the renewable energy generator from the first DC bus. The control algorithm may control whether the power from the renewable energy generator is directed to the battery or the electrical grid. The control algorithm may, when charging the battery, send control signals to operate the active switches of the DC/AC inverter at a 50% duty cycle and disable the active switches of the secondary side AC/DC rectifier, and when supplying power to the electrical grid, send control signals to disable the active switches of the DC/AC inverter and operate the active switches of the secondary side AC/DC rectifier at a 50% duty cycle. The power supplied may be regulated by the control algorithm, by changing the switching frequency. The control algorithm may further regulate renewable energy generation to provide maximum power point tracking (MPPT). The control algorithm may determine if power supplied from the renewable energy generator is substantially equal to a maximum power point target, and increase the duty cycle of the active switch of the boost converter to increase power supplied from the renewable energy generator until power supplied from the renewable energy generator is substantially equal to the maximum power point target.

It should be understood that a bidirectional battery charger integrated with renewable energy generation according to the teachings of this disclosure may include a variety of additional or alternative components disposed in various additional or alternative arrangements. This Summary is intended simply as an introduction to the reader, and does not indicate or imply that the teachings cover all aspects of the invention, or are necessary or essential aspects of the invention.

BRIEF DESCRIPTION OF THE DRAWINGS

The detailed description below refers to the accompanying drawings of example embodiments, of which.

DETAILED DESCRIPTION OF AN ILLUSTRATIVE EMBODIMENT

Definitions

As used herein the term "electric vehicle" should be interpreted as refer to any type of vehicle that derives some or all of its propulsion from an electrical source, including plug-in electric vehicles such as battery-only electric vehicles (BOEVs) and plug-in hybrid electric vehicle (PHEVs).

Further, as used herein the term "substantially" should be considered (in the absence of an explicit provision of another specific standard) to refer to being within ±5% of a quantity.

Description

Figure 1:
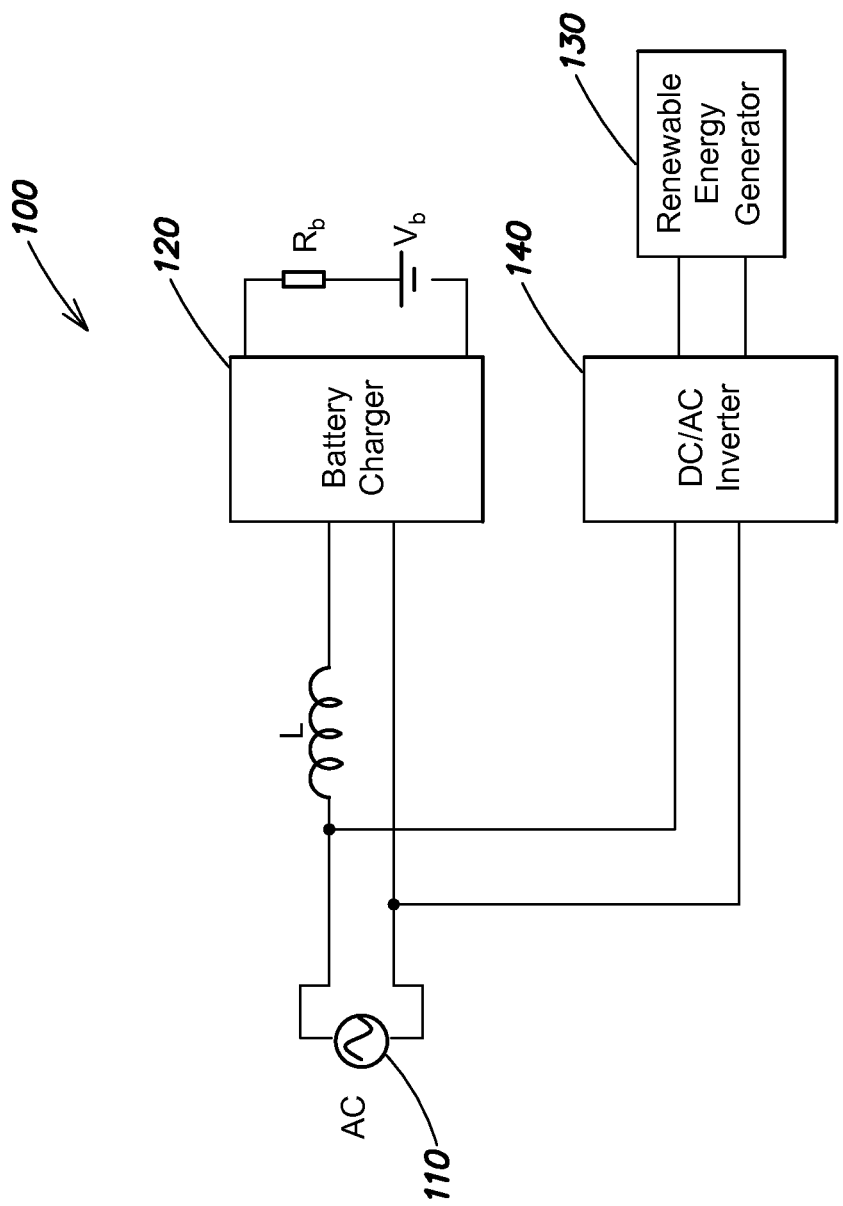
FIG. 1 is a schematic diagram of a typical isolated arrangement of a battery charger and renewable energy generator.
Figure 2:
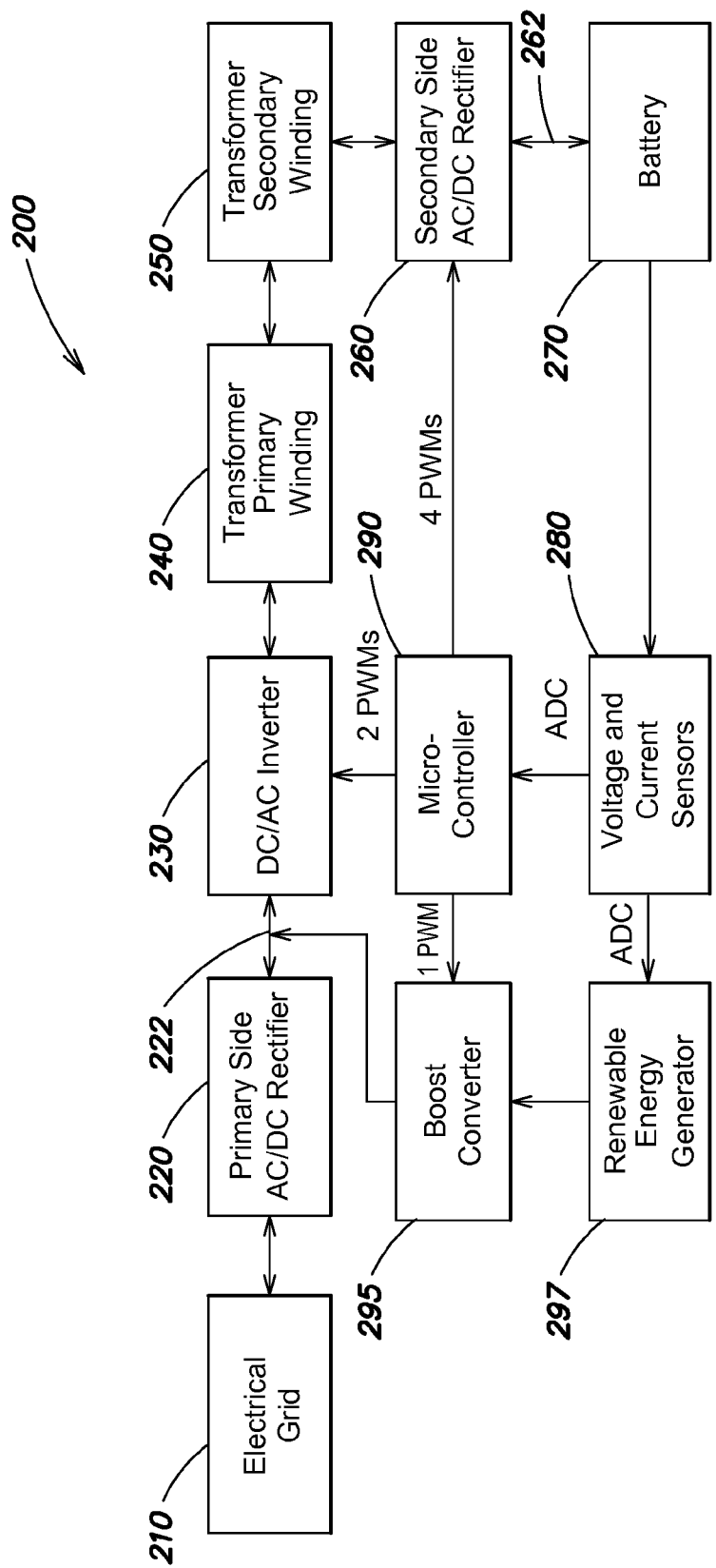
FIG. 2 is a high-level block diagram of an example bidirectional battery charger integrated with renewable energy generation.

FIG. 2 is a high-level block diagram 200 of an example bidirectional battery charger integrated with renewable energy generation. The electrical grid 210 may provide AC power (e.g., as 240V single phase to 480V three phase) when needed, and also sink AC power when there is surplus of renewable power or battery power available. The electrical grid 210 is coupled to a primary side AC/DC rectifier 220. The primary side AC/DC rectifier 220 is coupled via a first DC bus 222 to a boost converter 295 and a DC/AC inverter 230. The boost converter 295 may include an active switch (e.g., MOSFET). A renewable energy generator 297 (e.g., a solar array, wind turbine, geothermal generator, etc.) supplies DC power to the boost converter 295. The DC/AC inverter 230 may include two active switches (e.g., MOSFETs) coupled to a network of capacitors and an inductive element, which are in turn coupled to a primary winding 240 of a transformer. The primary winding 240 exchanges power with a secondary winding 250 of the transformer (e.g., via conductive wireless power transfer). The secondary winding 250 is coupled to a secondary side AC/DC rectifier 260 that may include a capacitor that performs DC-bias current blocking, and a bridge configuration of four active switches (e.g., MOSFETs). The secondary side AC/DC rectifier 260 is coupled via a second DC bus 262 to a battery 270, for example, of an electric vehicle (not shown). In one implementation, the second DC bus 262 may deliver substantially 11 kilowatts (kW) of power to the battery 270 at 200V to 450V.

Voltage and current sensors 280 are coupled to the battery 270 and renewable energy generator 297 to monitor power supplied to the battery (charging power) and power returned from the battery back toward electrical grid (discharge power), as well as power supplied from the renewable energy generator. After an analog-to-digital (ADC) conversion, the measure of charging power/discharge power and power supplied from the renewable energy generator is supplied to a microcontroller 290 (e.g., a floating point digital signal processor (DSP)) that executes a control algorithm. The microcontroller 290 provides control signals (e.g., pulse width modulated (PWM) signals) according to the control algorithm to the active switch of the boost converter 295, the active switches of the DC/AC inverter 230 and the active switches of the secondary side AC/DC rectifier 260.

Figure 3:
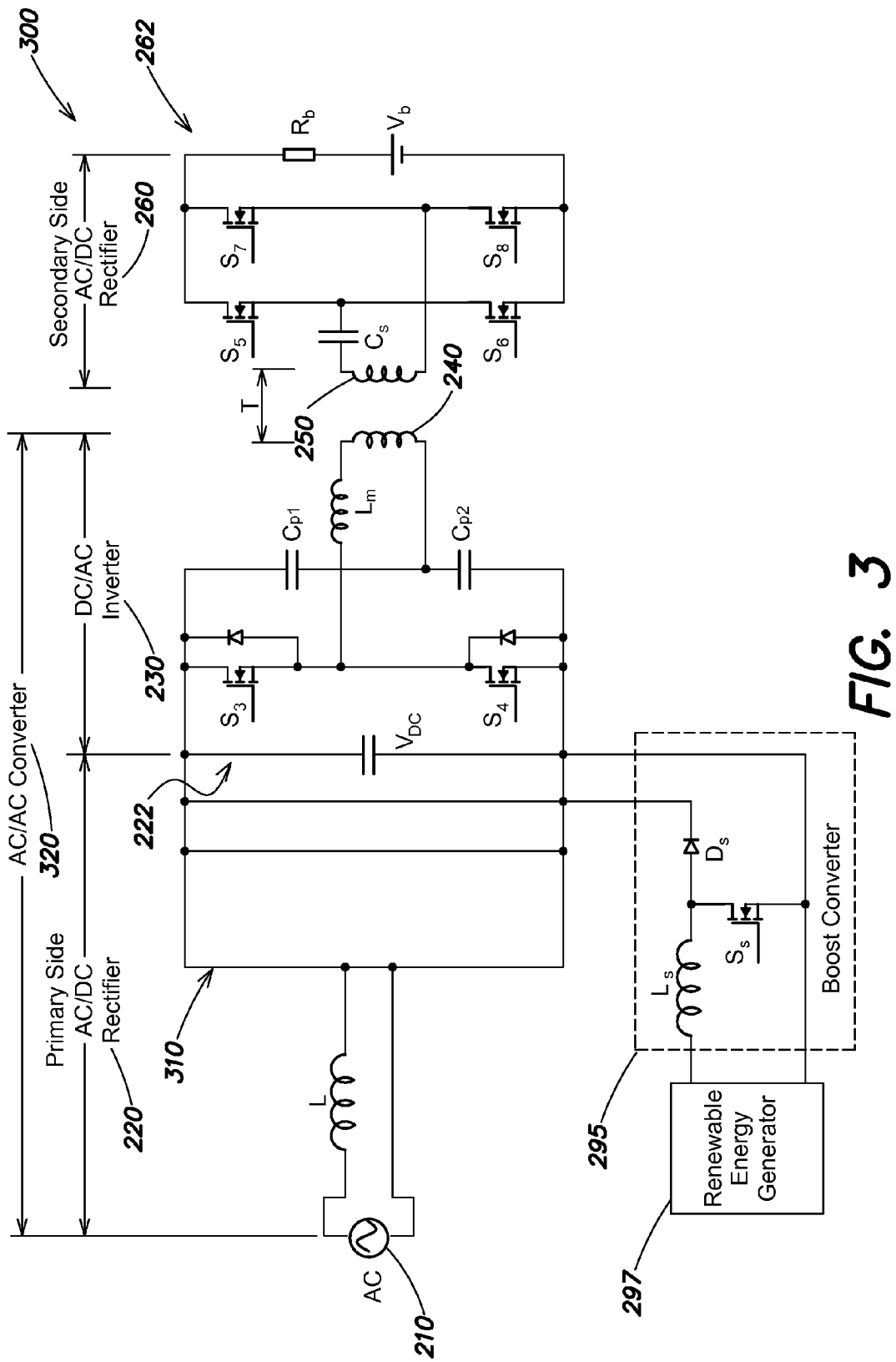
FIG. 3 is a schematic diagram of the example bidirectional battery charger integrated with renewable energy generation of FIG. 2, showing details of example circuitry.

FIG. 3 is a schematic diagram 300 of the example bidirectional battery charger integrated with renewable energy generation. For simplicity, the voltage and current sensors 280, the microcontroller 290, and any control signal paths coupling the microcontroller 290 to the active switches are omitted. The electrical grid 210 is coupled to an inductive element L and diodes and active switches (collectively 310) of the primary side AD/DC rectifier 220. The diodes and active switches 310 may be arranged according to a full-bridge PFC topology including fast-speed insulated-gate bipolar transistors (IGBTs) under space vector pulse width modulation (SVPWM) control, or some other arrangement. The primary side AD/DC rectifier 220 is coupled to a first DC bus 222 that has a voltage $V_{DC}$. The first DC bus 222 is also coupled to the boost converter 295 that includes an active switch $S_s$ coupled between an inductive element $L_s$ and a diode $D_s$ that are arranged in series, which receives power from the renewable energy generator 297 when renewable power available. The active switch $S_s$ may be an N-Channel Power MOSFET. The voltage rating of the active switch $S_s$ may be selected to be larger than voltage $V_{DC}$ of the first DC bus 222, and the current rating dependent on the power and voltage of the renewable energy generator 297 (e.g., greater than P/V where P is the power supplied by the renewable energy generator and V is the voltage supplied by the renewable energy generator). The voltage rating of the diode $D_s$ may be selected to be larger than voltage $V_{DC}$ of the first DC bus 222, and the current rating dependent on the power of the renewable energy generator 297 (e.g., greater than $P/V_{DC}$). The current rating of the inductive element $L_s$ may be dependent on the power of the renewable energy generator 297 (e.g., greater than P/V).

The first DC bus 222 is further coupled to the DC/AC inverter 230, which may include a pair of active switches $S_3$ and $S_4$ coupled to a network of capacitors $C_{p1}$ and $C_{p2}$, and an inductive element $L_m$. The active switches $S_3$ and $S_4$ may be N-Channel Power MOSFETs. Together the primary side AC/DC rectifier 220 and the DC/AV inverter 230 may be considered an AC/AC converter 320. The DC/AC inverter 230 is coupled to a primary side of a transformer T that, for example, supports conductive wireless power transfer to a secondary side of a transformer T coupled to a secondary side AC/DC rectifier 260. The secondary side AC/DC rectifier 260 may include a capacitor $C_s$ that performs DC-bias current blocking, as well as active switches $S_5$, $S_6$, $S_7$, and $S_8$ arranged in a bridge configuration. The active switches $S_5$, $S_6$, $S_7$, and $S_8$ may be N-Channel Power MOSFETs. The output of the secondary side AC/DC rectifier 260 is a voltage $V_b$ on a second DC bus 262 coupled to a battery 270 (having resistance $R_b$), for example, of an electric vehicle.

Figure 4:
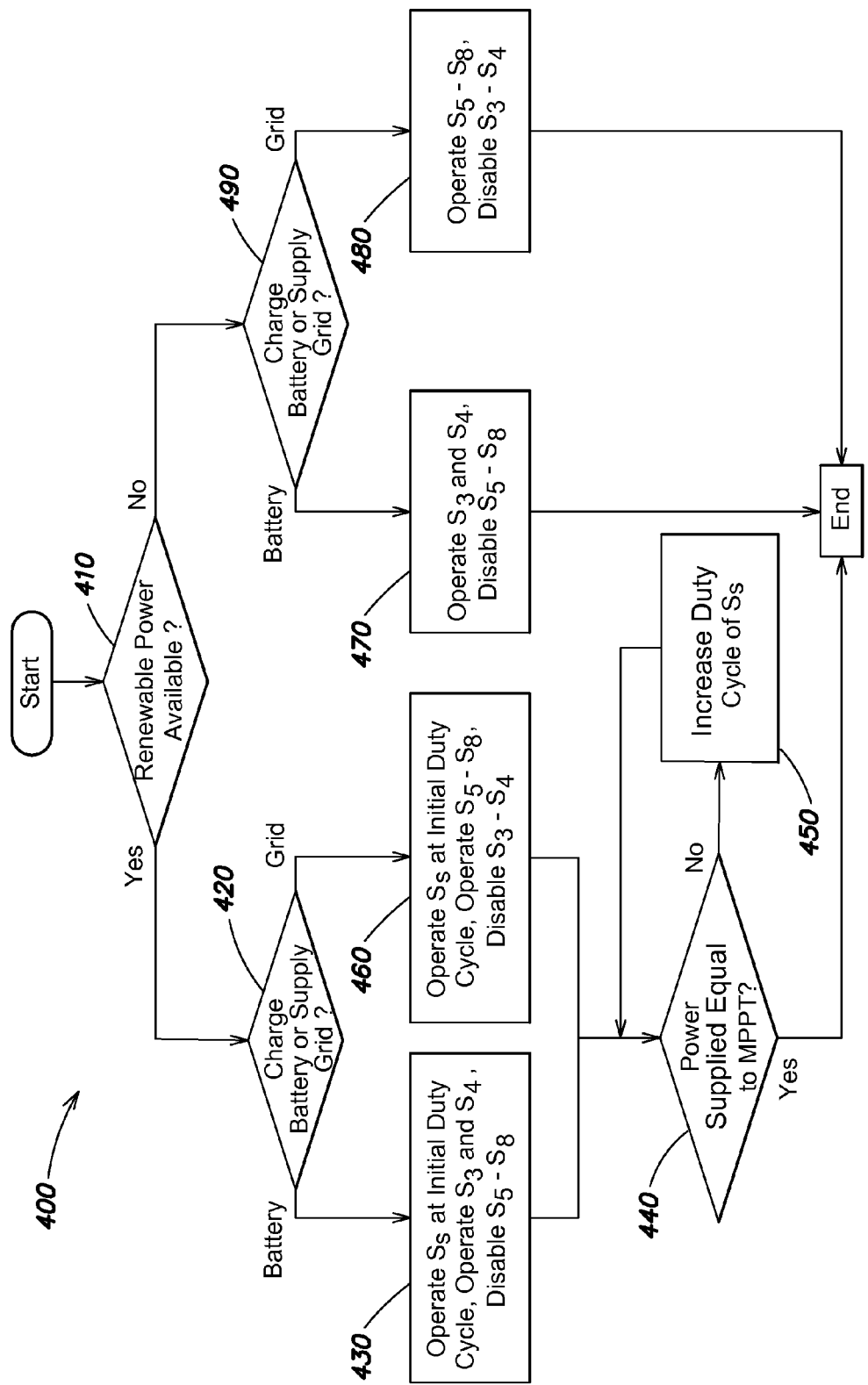
FIG. 4 is a flow diagram of certain steps of an example control algorithm that may be executed by a microprocessor of the example bidirectional battery charger integrated with renewable energy generation of FIGS. 2 and 3.

FIG. 4 is a flow diagram of certain steps 400 of an example control algorithm that may be executed by a microprocessor of the example bidirectional battery charger integrated with renewable energy generation of FIGS. 2 and 3. At step 410, the control algorithm determines whether renewable power is available from the renewable energy generator 297. If renewable power is available, execution proceeds to step 420 where the control algorithm determines if power is to flow to the second DC bus 262 to charge the battery 270, or is to flow to supply the electrical grid 210. If power is to charge the battery 270, execution proceeds to step 430, where the control algorithm sends a control signal (e.g., a PWM signal) to operate the active switch $S_s$ of the boost converter 295 at an initial duty cycle to allow power to flow from the renewable energy generator 297 to the first DC bus 222, and sends control signals (e.g., PWM signals) to operate the active switches $S_3$ and $S_4$ of the DC/AC inverter 230 at a 50% duty cycle and to disable the active switches $S_5$, $S_6$, $S_7$, and $S_8$ of secondary side AC/DC rectifier 260. The switching frequency of active switches $S_3$ and $S_4$ may be adjusted to adjust power flow to the battery (not shown). At step 440, the control algorithm determines whether power supplied from the renewable energy generator 297 is substantially equal to a maximum power point target. If so, execution terminates. If not, execution proceeds to step 450 where the control algorithm increases the duty cycle of the control signal sent to the active switch $S_s$ of the boost converter to increase power supplied from the renewable energy generator until power supplied from the renewable energy generator is substantially equal to the maximum power point target.

Returning back to decision step 420, if power is to supply the electrical grid 210, execution proceeds to step 460 where the control algorithm sends a control signal (e.g., a PWM signal) to operate the active switch $S_s$ at an initial duty cycle to allow power to flow from the renewable energy generator 297 to the first DC bus 222 and sends control signals (e.g., PWM signals) to disable the active switches $S_3$ and $S_4$ of the DC/AC inverter 230 and operate the active switches $S_5$, $S_6$, $S_7$, and $S_8$ of the secondary side AC/DC rectifier 260 at a 50% duty cycle. The switching frequency may be adjusted to adjust power flow to the electrical grid (not shown).

Returning back to decision step 410, if renewable power is not available from the renewable energy generator 297, execution proceeds to step 490 where the control algorithm determines if power is to flow to the second DC bus 262 to charge the battery 270, or is to flow to supply the electrical grid 210. If power is to charge the battery 270, execution proceeds to step 470, where the control algorithm sends a control signal (e.g., a PWM signal) to disable the active switch $S_s$ to isolate the renewable energy generator 270 from the first DC bus 222, and sends control signals (e.g., PWM signals) to operate the active switches $S_3$ and $S_4$ of the DC/AC inverter 230 at a 50% duty cycle and to disable the active switches $S_5$, $S_6$, $S_7$, and $S_8$ of secondary side AC/DC rectifier 260. The switching frequency of active switches $S_3$ and $S_4$ may be adjusted to adjust power flow to the battery (not shown). Execution may then end. If power is to supply the electrical grid 210, execution proceeds to step 480 where the control algorithm sends a control signal (e.g., a PWM signal) to disable the active switch $S_s$ to isolate the renewable energy generator 270 to the first DC bus 222, and control signals (e.g., PWM signals) to disable the active switches $S_3$ and $S_4$ of the DC/AC inverter 230 and operate the active switches $S_5$, $S_6$, $S_7$, and $S_8$ of the secondary side AC/DC rectifier 260 at a 50% duty cycle. The switching frequency of active switches $S_5$, $S_6$, $S_7$, and $S_8$ may be adjusted to adjust power flow to the electrical grid (not shown).

In conclusion, while the above description discusses an example embodiment of a bidirectional battery charger integrated with renewable energy generation, it should be understood that modifications and/or additions may be made without departing from the disclosure's in-tended spirit and scope. For example, while various specific hardware components are discussed above, it should be understood that one or more functionally similar components may be substituted for many of such components, to achieve similar effects. Above all, it should be understood that the above descriptions are meant to be taken only by way of example.

What is claimed is:

1. A bidirectional battery charger integrated with renewable energy generation, comprising
    a primary side alternating current/direct current (AC/DC) rectifier coupled to an electrical grid and a first direct current (DC) bus;
    a direct current/alternating current (DC/AC) inverter coupled to the first DC bus and a primary winding of a transformer;
    a secondary side AC/DC rectifier coupled to a secondary winding of the transformer and a battery;
    a boost converter coupled to a renewable energy generator and the first DC bus, the boost converted including an active switch; and
    a microcontroller coupled to the active switch of the boost converter, and configured to provide control signals thereto according to a control algorithm, the control algorithm to:
        when renewable power is available, send control signals to operate the active switch of the boost converter at a duty cycle to allow power to flow from the renewable energy generator to the first DC bus, and
        when renewable power is not available, send control signals to disable the active switch of the boost converter to isolate the renewable energy generator from the first DC bus.

2. The bidirectional battery charger of claim 1, wherein the DC/AC inverter includes active switches and the control algorithm is further configured to:
    when charging the battery, send control signals to operate the active switches of the DC/AC inverter at a second duty cycle, and
    when supplying power to the electrical grid, send control signals to disable the active switches of the DC/AC inverter.

3. The bidirectional battery charger of claim 2, wherein the secondary side AC/DC rectifier includes a capacitor that performs DC-bias current blocking, and a bridge configuration of active switches coupled to the capacitor, and the control algorithm is further configured to:

when charging the battery, send control signals to disable the active switches of the secondary side AC/DC rectifier, and when supplying power to the electrical grid, send control signals to operate the active switches of the secondary side AC/DC rectifier at the second duty cycle.

4. The bidirectional battery charger of claim 3, wherein the control signals are pulse width modulated (PWM) control signals, and the active switches of the DC/AC inverter and the active switches of the secondary side AC/DC rectifier are operated at a switching frequency that determines power flow.

5. The bidirectional battery charger of claim 1, wherein the control algorithm is further configured to:

when renewable power is available, determine if power supplied from the renewable energy generator is substantially equal to a maximum power point target, and increase the duty cycle of the active switch of the boost converter to increase power supplied from the renewable energy generator until power supplied from the renewable energy generator is substantially equal to the maximum power point target.

6. The bidirectional battery charger of claim 1, wherein the active switch in the boost converter is coupled between an inductive element and a diode that are arranged in series.

7. The bidirectional battery charger of claim 1, wherein the active switch in the boost converter is a metal oxide semiconductor field-effect transistor (MOSFET).

8. The bidirectional battery charger of claim 1, wherein the bidirectional battery charger is an AC fast charger for an electric vehicle, and the battery is a battery of the electric vehicle.

9. The bidirectional battery charger of claim 1, wherein the renewable power is solar power, and the renewable energy generator is a solar array.

10. A bidirectional alternating current/alternating current (AC/AC) converter, comprising an alternating current/direct current (AC/DC) rectifier coupled to a direct current (DC) bus;

a direct current/alternating current (DC/AC) inverter coupled to the first DC bus and an alternating current (AC) load, the DC/AC inverter including active switches;

a boost converter coupled to a renewable energy generator and the first DC bus, the boost converted including an active switch;

a microcontroller coupled to the active switches of the DC/AC inverter and the boost converter, and configured to provide control signals thereto according to a control algorithm, the control algorithm to:

when renewable power is available, send control signals to operate the active switch of the boost converter at a duty cycle to allow power to flow from the renewable energy generator to the first DC bus, and when renewable power is not available, send control signals to disable the active switch of the boost converter to isolate the renewable energy generator from the first DC bus.

11. The bidirectional AC/AC converter of claim 10, wherein the AC/DC rectifier is also coupled to an electrical grid, the DC/AC inverter includes active switches and the control algorithm is further configured to:

when power is to flow to the AC load, send control signals to operate the active switches of the DC/AC inverter at a second duty cycle, and when power is to supply the electrical grid, send control signals to disable the active switches of the DC/AC inverter.

12. The bidirectional AC/AC converter of claim 11, wherein the control signals are pulse width modulated (PWM) control signals, and the active switches of the DC/AC inverter are operated at a switching frequency that determines power flow.

13. The bidirectional AC/AC converter of claim 10, wherein the control algorithm is further configured to:

when renewable power is available, determine if power supplied from the renewable energy generator is substantially equal to a maximum power point target, and increase the duty cycle of the active switch of the boost converter to increase power supplied from the renewable energy generator until power supplied from the renewable energy generator is substantially equal to the maximum power point target.

14. The bidirectional AC/AC converter of claim 10, wherein the active switch in the boost converter is coupled between an inductive element and a diode that are arranged in series.

15. The bidirectional AC/AC converter of claim 10, wherein the active switch in the boost converter is a metal oxide semiconductor field-effect transistor (MOSFET).

16. The bidirectional AC/AC converter of claim 10, wherein the AC load is a primary winding of a transformer, and the bidirectional AC/AC converter is part of a bidirectional battery charger that further includes a secondary side AC/DC rectifier coupled to a secondary winding of the transformer and a second DC bus coupled to a battery.

17. The bidirectional AC/AC converter of claim 16, wherein the bidirectional battery charger is an AC fast charger for an electric vehicle, and the battery is a battery of the electric vehicle.

18. A bidirectional battery charger integrated with renewable energy generation, comprising a primary side alternating current/direct current (AC/DC) rectifier coupled to an electrical grid and a first direct current (DC) bus;

a direct current/alternating current (DC/AC) inverter including metal oxide semiconductor field-effect transistors (MOSFETs) coupled to the first direct current (DC) bus and to a primary winding of a transformer;

a secondary side alternating current/direct current (AC/DC) rectifier coupled to a secondary winding of the transformer and to a second DC bus coupled to a battery, that includes a bridge configuration of MOSFETs;

a boost converter coupled to a renewable energy generator and the first DC bus, the boost converted including a MOSFET; and a microcontroller coupled to the MOSFETs of the DC/AC inverter, secondary AC/DC rectifier, and boost converter, and configured to provide control signals thereto according to a control algorithm that operates the MOSFETs of the DC/AC inverter, the secondary side AC/DC rectifier and the boost converter to causes power from the renewable energy generator to charge the battery without passing though the primary side AC/DC rectifier and power from the renewable energy generator to supply the electrical grid without passing through the DC/AC inverter and the secondary side AC/DC rectifier.

19. The bidirectional battery charger of claim 18, wherein the control algorithm is further configured to:

when renewable power is available, determine if power supplied from the renewable energy generator is substantially equal to a maximum power point target, and increase the duty cycle of the MOSFET of the boost converter to increase power supplied from the renewable energy generator until power supplied from the renewable energy generator is substantially equal to the maximum power point target.

20. The bidirectional battery charger of claim 18, wherein the bidirectional battery charger is an AC fast charger for an electric vehicle, and the battery is a battery of the electric vehicle.

\* \* \* \* \*